United States Patent [19]

Cross et al.

[11] Patent Number: 5,378,402
[45] Date of Patent: Jan. 3, 1995

[54] POLYMER COMPOSITIONS

[75] Inventors: Malcolm G. Cross; Robert Lines, both of Swindon, England

[73] Assignee: Raychem Limited, London, United Kingdom

[21] Appl. No.: 516,176

[22] Filed: Jul. 21, 1983

[30] Foreign Application Priority Data

Aug. 2, 1982 [GB] United Kingdom ............... 8222303
Oct. 18, 1982 [GB] United Kingdom ............... 8229726

[51] Int. Cl.$^6$ ............................................. H01B 1/00
[52] U.S. Cl. ......................................... 252/500; 525/186; 525/189; 525/203; 525/204; 525/281; 525/279; 528/423
[58] Field of Search ............... 252/500; 525/186, 189, 525/203, 204, 281, 279; 528/423

[56] References Cited

U.S. PATENT DOCUMENTS

| | | | |
|---|---|---|---|
| 3,536,781 | 10/1970 | Cotter et al. | 252/500 |
| 4,011,176 | 3/1977 | Saunders et al. | 252/500 |
| 4,288,352 | 9/1981 | Weiss et al. | 252/511 |
| 4,401,545 | 8/1983 | Naarmann et al. | 252/500 |
| 4,416,959 | 11/1983 | Skotheim | 429/111 |
| 4,442,185 | 4/1984 | Skotheim | 429/111 |
| 4,552,927 | 11/1985 | Warren | 525/279 |
| 4,956,441 | 9/1990 | Kathirgamanthan et al. | 528/171 |
| 5,130,054 | 7/1992 | Jasne | 252/500 |

OTHER PUBLICATIONS

Chemica Scripta (1981) 17, 145–148.

*Primary Examiner*—Linda Skaling
*Attorney, Agent, or Firm*—Herbert G. Burkard; Timothy H. P. Richardson

[57] ABSTRACT

Electrically conductive polymers, especially polypyrroles, are formed with a charged polymeric dopant supplying the necessary counter-ions to stabilise the charged conductive form of the conductive polymer. The physical properties of the conductive polymer can thus be usefully modified in ways different from those achieved by non-polymeric dopants or by forming the conductive polymers in pre-existing bodies of non dopant (i.e. uncharged) polymers.

24 Claims, 2 Drawing Sheets

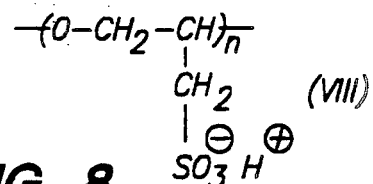
FIG. 8 (VIII)
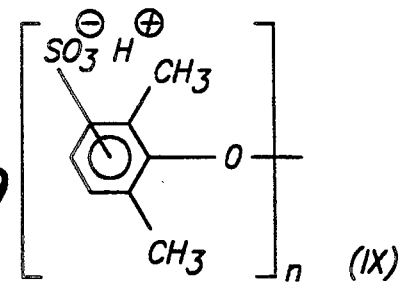
FIG. 9 (IX)
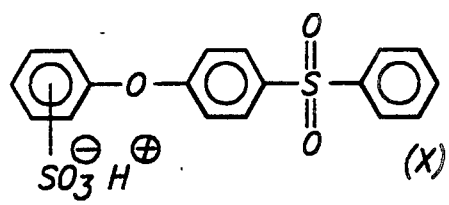
FIG. 10 (X)
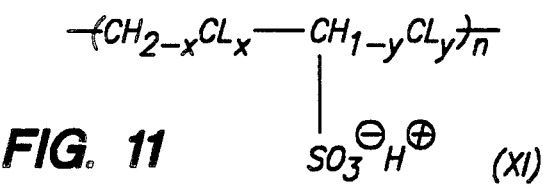
FIG. 11 (XI)
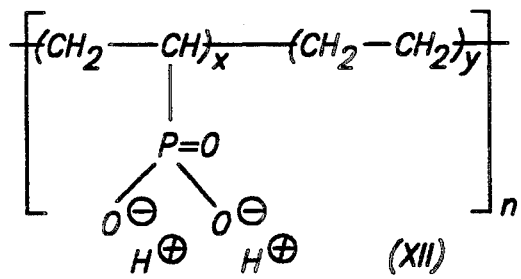
FIG. 12 (XII)
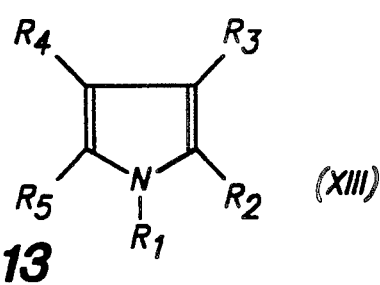
FIG. 13 (XIII)
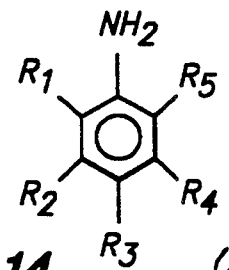
FIG. 14 (XIV)
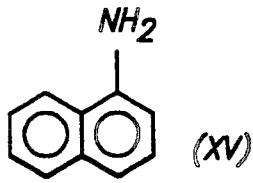
FIG. 15 (XV)
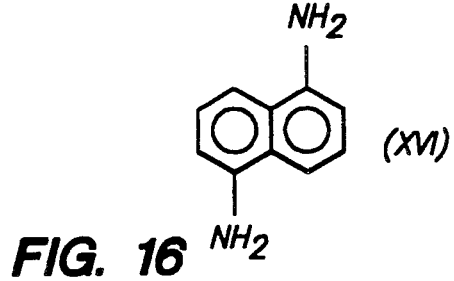
FIG. 16 (XVI)

POLYMER COMPOSITIONS

BACKGROUND OF THE INVENTION

1. Field of the Invention

This invention relates to compositions comprising an electrically conductive polymer.

2. Introduction to the Invention

Known electrically conductive polymers include polysulphur nitrides, aniline polymers (i.e. polymers of aniline and/or a substituted aniline), pyrrole polymers (i.e. polymers of pyrroles and/or substituted pyrroles) and polyacetylenes. Although some polymers, e.g. $(SN)_x$, are intrinsically conductive, many polymers require oxidation (or reduction) to render them significantly electrically conductive, or can have their conductivity substantially enhanced by oxidation or reduction. For example, polyacetylenes require oxidation or reduction, and polypyrroles require oxidation. The process of oxidation (or reduction) is referred to herein as "doping". A counter-ion is required to associate itself with the oxidised (or reduced) polymer to balance the ionic charges therein, and such counter-ions and the materials used to provide them are referred to herein as "dopants". Examples of dopants include $BF_4^-$, p-toluene sulphonate and $Br^-$.

The term "electrically conductive polymer" is used herein to mean any polymer (including oligomer) which is inherently or intrinsically capable of electrical conductivity, regardless of whether or not it has been rendered electrically conductive by doping or is capable of being rendered electrically conductive by doping. The term "electrically conductive" is used to include materials which are semi-conductive as well as those which are conductive. Examples of electrically conductive polymers include inorganic polymers such as the polysulphur nitrides, and organic polymers such as the polypyrroles, and particularly includes the organic polymers whether in the "doped" electrically more conductive state, or in the "undoped" or "de-doped" electrically less conductive state.

SUMMARY OF THE INVENTION

We have now discovered that polymers containing electrically charged groups can be excellent dopants for electrically conductive polymers.

In its first aspect, the present invention provides a polymer composition comprising an electrically conductive polymer and a polymeric dopant which includes electrically charged groups which stabilise the polymer when the polymer is in an electrically conductive state. The polymeric dopant is a polymer (including oligomer) which provides (or is capable of providing during a doping process) the necessary counter-ions for stabilising the conductive polymer. The charged groups in the polymeric dopant can be present in the polymer backbone and/or as side chains or pendant groups; examples of such a polymeric dopant include polymers (including oligomers) carrying ionisable sulphonate, carboxylate, or phosphonate groups, polyelectrolytes, and ionenes (generic name for ionic amines).

The use of a polymeric dopant according to the present invention leads to very considerable advantages over the dopants used in the past. For example, the physical and/or chemical characteristics of the polymeric dopant can be used to modify those of the conductive polymer itself. Furthermore, because the modifying polymer is also the dopant, it can be drawn into the conductive polymer during formation of the latter in a solution of the dopant to form a modified polymer film which will have different properties from those which can be achieved by forming a conventionally doped conductive polymer in a solvent-swollen preformed article, e.g. film, of another polymer. Also, because the polymeric dopant will tend to interpenetrate with the conductive polymer, it can provide an intimate combination of the materials which will be highly resistant to undesired loss of dopant and de-doping.

Thus, further aspects of the present invention provide (1) a method of making an electrically conductive polymer, comprising bringing the polymer from an electrically less conductive state to an electrically more conductive state in the presence of a polymeric dopant which stabilises the polymer in the more conductive state; (2) a method of making an electrically conductive polymer comprising polymerising an appropriate monomer in the presence of a polymeric dopant capable of stabilising the electrically conductive polymer in an electrically conductive state; (3) a method of making an electrically conductive polymer comprising polymerising an appropriate monomer and bringing it into an electrically conductive state in a solution of a polymeric dopant capable of stabilising the polymer in the electrically conductive state; and (4) a method of making an electrically conductive polymer comprising providing the conductive polymer in association with a monomer which is polymerisable to produce in situ a polymeric dopant capable of stabilising the conductive polymer in an electrically conductive state, and preferably including the step of polymerising the said monomer to produce the dopant.

BRIEF DESCRIPTION OF THE DRAWING

The invention is illustrated in the accompanying drawing, in which

FIGS. 6 to 12 show the formulae of examples of negatively charged polymeric dopants;

FIG. 13 shows the formula of a pyrrole monomer from which an electrically conductive polypyrrole can be derived;

FIG. 14 shows the formula of an aniline monomer from which an electrically conductive polyaniline can be derived; and FIGS. 15 and 16 show the formulae of naphthylamines from which electrically conductive polymers can be derived.

DETAILED DESCRIPTION OF THE INVENTION

Figure 1:
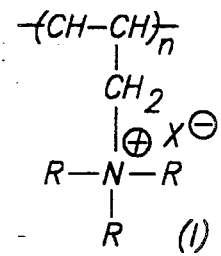
FIGS. 1 to 5 show the formulae of examples of positively charged polymeric dopants.
Figure 2:
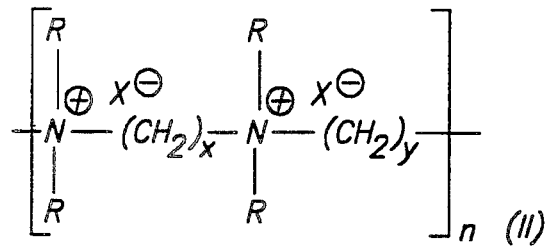
Figure 3:
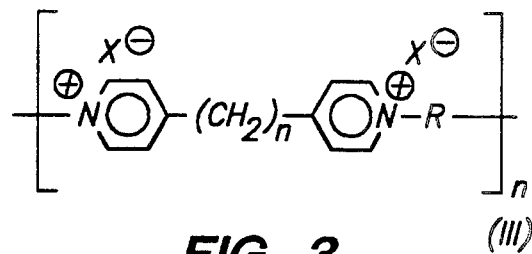
Figure 4:
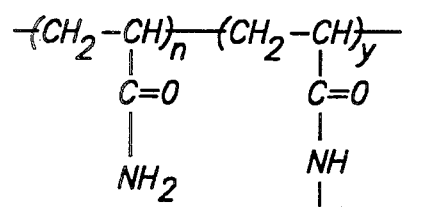
Figure 5:
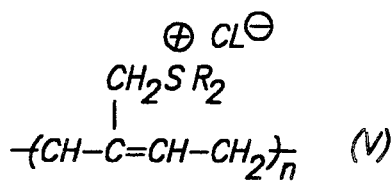
Figure 6:
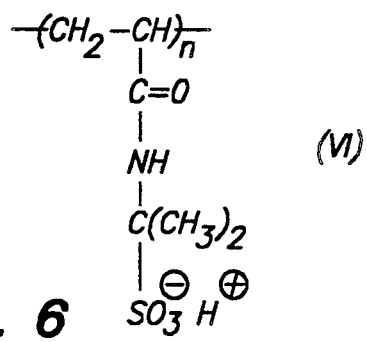
Figure 7:
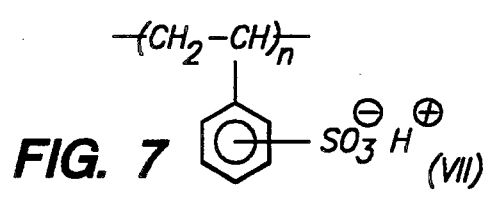

The specific choice of polymeric dopant will depend on the nature of the conductive polymer to be formed. Positively charged dopants may be appropriate when negatively charged conductive polymers such as polyacetylenes are involved. Examples of positively charged polymeric dopants are ionenes of formula (I), (II), or (III) in the accompanying formula drawings; acrylamide copolymers such as copoly(acrylamide)(3-acrylamido-3-metylbutyltrimethyl ammonium chloride) of formula (IV) on the accompanying formula drawings; and polymers of 2-methylene ammonium or 2-methylenesulphonium salts of 1,3-butadiene, of formula (V) in the accompanying formula drawings. In the formula drawings, R represents suitable organic substituent groups and n,x,y are integers of suitable value, suitable groups and integers being readily identifiable by persons familiar with this field of technology.

Negatively charged dopants, however, are more likely to be of interest, especially in connection with polypyrroles, which are a preferred class of electrically conductive polymers in view of their resistance to degradation on aging. An outstanding advantage of the present invention is the possibility of producing flexible shaped articles, e.g. self-supporting films, of pyrrole polymers, which tend to be undesirably brittle and difficult to handle. In such self-support films, preferably the concentration of the conductive polymer is greater at one surface (which may be designated the first surface) than at the other surface (which may be designated the second surface), and the concentration of the polymeric dopant is greater at the second surface than at the first surface. Examples of negatively charged polymeric dopants are ionisable polysulphonates such as salts of poly(2-acrylamido-2-methyl-propane sulphonic acid) or its copolymers with acrylamides or alkyl methacrylates, sulphonated polystyrene, sulphonated polyepichlorohydrin, sulphonated poly(2,5-dimethylphenylene oxide), sulphonated polyphenylether sulphones (or ketones), and sulphonated polyethylene, of formulae (VI) to (XI) respectively in the accompanying formula drawings; polyvinylsulphonic acid sodium salt (m.w=2000), polyacrylic acid (m.w=90,000), polymaleic acid, sulphonated EPDM, being an elastomer, could also advantageously be used; polycarboxylates such as salts of polyacrylic acid and copolymers of acrylic acid; and phosphonated polymers such as that indicated by formula (XII) in the accompanying formula drawings. The negatively charged groups may be on the polymer backbone and/or on pendant side chains, and the polymers may be aromatic and/or aliphatic in nature. Copolymers and/or mixtures and blends of the above dopants can be used.

It should be noted that the polymeric dopant itself may provide a certain amount of ionic conductivity, but this is usually clearly distinguishable from the intrinsic electronic conductivity of the conductive polymer.

As aforesaid, an especially interesting class of electrically conductive polymers comprises polypyrrole and its derivatives, which may be prepared from pyrrole or suitably substituted derivatives thereof, as generally indicated by formula (XIII) in the accompanying formula drawings, sufficient positions being left unsubstituted to permit the required polymerisation. Electrically conductive polymers are generally believed to operate by way of a conjugated pi-electron system, and it will be understood that some substituents or combinations of substituents may interfere with the conjugated system so as to detract from or destroy the desired electrical conductivity, acceptable substituents being readily determinable by simply testing the conductivity of the resulting polymer.

Other classes of electrically conductive polymer which may benefit from the use of polymeric dopants according to the present invention include polymers of anilines and naphthylamines of formula (XIV), (XV) and (XVI); and conjugated polymers such as polyacetylenes and polyphenylenes.

The electrically conductive polymers with polymeric dopants according to the present invention may be prepared in several different ways.

Electrochemical methods of preparing electrically conductive polymers can be used as follows to produce the polymer-doped materials of the present invention. In general, an electrochemical cell is used, wherein two electrodes (made from, for example, stainless steel, platinum or indium oxide coated glass) are immersed in an electrolyte mixture, suspension or solution. The electrolyte includes a polymer carrying groups which are ionisable into an appropriately charged ionic dopant species. The solvent or mixture of solvents may be chosen from protic and aprotic solvents, for example acetonitrile, tetrahydrofuran, dimethyl formamide, water, methanol. To the electrolyte mixture is added the monomer species that is to be oxidatively polymerised to form the desired electrically conductive polymer. Stirring of the resulting mixture may be required to achieve a homogeneous mixture. Upon operation of the cell, an electrically conducting film is formed on the appropriate electrode. With positively charged polymers such as polypyrroles, the film is formed on the anode and is partially oxidised and contains a negatively charged polymer dopant to provide charge neutrality to the film.

Chemical preparative methods can also be used, in which the monomer and the polymeric dopant are mixed with an oxidising agent in a suitable liquid vehicle. The oxidising agent can advantageously be carried by the polymeric dopant of the present invention, for example by forming the ferric salt of a dopant such as sulphonated polystyrene, thereby bringing about simultaneous oxidative polymerisation and doping with the negatively charged polymeric dopant. This ingeniously avoids or reduces the degree of doping with inorganic anions, which would occur if ferric chloride were used as the oxidising agent.

Some specific examples of the present invention will now be described, in which electrical conductivity was measured by a 4-probe method similar to that described in "Organic Semiconducting Polymers", Ed. J. E. Katon, (Marcel Dekker 1968).

Sulphonated polymeric dopants were obtained as follows, unless otherwise stated in the Examples.

Sulphonated Polyethylene

Commercially available chlorosulphonated polyethylene (density 1.28) containing 1.1% by wt. S, which indicates a degree of sulphonation of approx. 2% by weight, was hydrolysed with NaOH to convert the $SO_2Cl$ groups to $-SO_3^-Na^+$ (see Formula XI) and used in this form as the electrolyte in the electrochemical doping experiments.

Sulphonated Polystyrene

Polystyrene (average molecular wt 70,000) was treated with chlorosulphonic acid and the product was subsequently hydrolysed to give an acidic ionisable polymer, that contained 3.23% by wt. S (degree of sulphonation approx. 12% by wt.).

Sulphonated poly(2,5-dimethylphenylene oxide)

Commercially available poly(2,5-dimethylphenylene oxide) was treated with chlorosulphonic acid and subsequently hydrolysed to give an acidic ionisable polymer, containing 3.54% by wt. S (degree of sulphonation approx. 16% by wt.).

Preparation of Sulphonated Poly(vinyl alcohol)

24.8 g Chlorsulphonic acid added slowly with rapid stirring to 100 mls pyridine. This solution was added to a suspension of 8.8 g poly(vinyl alcohol) of molecular weight 14000 in 100 ml. pyridine. The mixture was heated at 90° C. for one hour with continuous stirring, allowed to cool to room temperature and solids were removed by vacuum filtration. The solids were redissolved in 200 mls distilled water; 100 mls of water were then removed on a rotary evacuator, and the remaining solution was acidified with 50 mls 1M HCl. The polymer was precipitated by addition of methanol, redissolved in water and reprecipitated with methanol, washed with methanol and dried over $P_2O_5$ under vacuum.

Degree of sulphonation=25% by weight determined by sulphur content.

Preparation of a Sulphonated Styrene (Hydrogenated) Butadiene Copolymer 800 mls dichloromethane were placed in a 2 litre round bottomed flask fitted with two 500 ml dropping funnels, high speed stirrer, reflux condenser, $N_2$ inlet and gas outlet attached to inverted funnel/$H_2O$ gas absorber. One of the dropping funnels contained 20 g of a commercially available styrene-(hydrogenated) butadiene copolymer dissolved in 500 mls dichloromethane the other funnel contained 3.6 mls chlorosulphonic acid in 500 mls dichloromethane.

The reaction flask was cooled to 5° C. and kept at this temperature during the addition of the reactants. The solutions of chlorosulphonic acid and the polymer were added at the same slow rate over approximately 3 hours. Rapid stirring was maintained throughout the addition. After addition was complete stirring was continued and the reaction maintained at 5° C. for 16 hours. The temperature was allowed to rise to room temperature and the reaction left stirring for a further 24 hours. The reaction was monitored by the quantity of HCl liberated. The HCl was measured by titrating the water in the gas absorber with 1M NaOH using phenolphthalein indicator.

The dichloromethane was removed from the precipitated polymer by a combination of decanting, filtration and rotary evacuation. The polymer was dissolved in THF and precipitated by addition with rapid stirring, to distilled water. THF was removed from the water/polymer suspension by rotary evacuation and the polymer filtered. Polymer dried at 40° C. under vacuum and over NaOH $C^{13}$ NMR shows addition of sulphonic acid to be an aromatic section of polymer. Sulphur content=4.8%. This can be altered by time of reaction.

EXAMPLE 1

Two stainless steel electrodes 2 cm apart were employed as the anode and cathode of an electrolytic cell, having an electrolyte mixture consisting of 1 g commercially available (Aldrich) poly(2-acrylamido-2-methyl propane sulphonic acid) in a mixture of 37 cc water and 10 cc acetonitrile, together with 0.06 moles of pyrrole. During the operation of the cell the mixture was stirred.

The electrolytic cell was powered by a D.C. power supply. Electrolysis of the electrolyte mixture was carried out by applying to the cell an electrical potential of 5 V for a period of one hour, during which time the current density was 5 $mAcm^{-2}$.

A black film (33 microns thick) was deposited on the anode and was removed to give a free-standing film that was tough and flexible while wet. After drying in air the film was brittle, and could not be creased or folded in two like paper without fracturing. The "dry" film has a room temperature conductivity (4 probe measurement) of 25 $Scm^{-1}$.

EXAMPLE 2

A similar procedure to that of Example 1 was followed but this time employing as the electrolyte a solution of 2 g of the acid form of sulphonated (poly2,5-dimethylphenylene oxide) in 75 cc water. The cell was operated at a current density of 5 $mAcm^{-2}$ for 45 minutes. A black free standing film 36 microns thick was obtained that was extremely tough and flexible when wet. When dry the film was very brittle and had a room temperature conductivity of 0.3 $Scm^{-1}$.

EXAMPLE 3

The procedure of Example 2 was repeated, but this time employing as the electrolyte a solution of 2 g of the acid form of sulphonated poly(2,5-dimethylphenylene oxide) in 50 cc DMF, and the polymerisable species used was aniline (0.02 moles), at current density of 6 $mAcm^{-2}$ for 45 minutes.

A black film was deposited on the anode and could be removed to give (it is believed for the first time) a free-standing film consisting substantially only of polyaniline and dopant. The film was very brittle, and the sample was too small for conductivity to be determined.

EXAMPLE 4

The procedure of Example 1 was followed, but this time employing as the electrolyte 5 g of the sodium salt of sulphonated polyethylene in a mixture of 1.5 cc of water and 50 cc of tetrahydrofuran, at a current density of 1 $mAcm^{-2}$ for a period of one hour.

A black film was deposited on the anode and on removal was found to be flexible (creaseable) and stretchable (30% elongation to break) both when wet and when dry, with a dry conductivity of about $10^{-3}$ $Scm^{-1}$.

EXAMPLE 5

The procedure of Example 1 was followed but this time employing as the electrolyte mixture, 2 g of the sodium salt of sulphonated polystyrene in 50 cc acetonitrile, at a current density of 1 $mAcm^{-2}$ for 45 minutes.

A shiny black film was formed on the anode and when dry was very brittle. (Conductivity not determined.)

EXAMPLE 6

Sulphonated Poly(vinyl alcohol)

0.03 moles of pyrrole were dissolved in 30 mls of a solution of 2 g 25% sulphonated poly(vinyl alcohol) in 50 mls DMF and 20 mls water. This solution was electrolysed for one and a half hours at a current density of 10 mA $cm^2$ on stainless steel electrodes as in Example 1. A black film of polypyrrole doped with sulphonated polyvinyl alcohol was removed from the anode. The film was 0.24 mm thick and had a conductivity of 2.56 $Scm^{-1}$. The dry film was tough but brittle.

EXAMPLE 7

Poly(methacrylic acid)

0.045 moles of pyrrole were dissolved in 50 mls of a solution of 10 g poly(methacrylic acid) supplied by BDH in 40 mls water and 50 mls methanol. This solution was electrolysed for one and a half hours at a current density of 10 $mAcm^2$ on stainless steel electrodes.

A black film of polypyrrole doped with poly(methacrylic acid) was removed from the anode. The film was 0.09 mm thick and had a conductivity of 1.70 $Scm^{-1}$. The dry film was brittle.

EXAMPLE 8

Sulphonated Sytrene (Hydrogenated) Butadiene Copolymer

An electrolysis solution was prepared by dissolving pyrrole (5% v) in a solution of the sulphonated polymer (2% wt.) in tetrahydrofuran:nitrobenzene (75/25 v/v). This solution was electrolysed in a cell consisting of a solid stainless steel anode and a stainless steel gauze cathode separated by 5 mm. A constant current of 1 $mAcm^{-2}$ was passed for 20 minutes. Stirring of the electrolyte was maintained throughout the electrolysis. The polypyrrole film was peeled from the anode and washed in tetrahydrofuran and then dried under vacuum at 50° C. Film thickness was 0.4 mm.

Physical Properties

The film was smooth on one side (electrode side) and very rough on the other (solution side). The smooth side had a conductivity of $5\times10^{-3}$ $Scm^{-1}$ while the rough side was essentially con-conductive. Examination of the film under a microscope revealed a laminate structure. The film could be moulded readily under heat and pressure to give a completely smooth film. Also, by folding the film in half and hot pressing a film conductive on both sides was obtained.

Film as prepared: thickness 0.4 mm, ultimate elongation 410%, stress at failure 18 MPa.

Pressed film: thickness 0.27 mm, ultimate elongation 390%, stress at failure 32 MPa.

We claim:

1. A polymer composition comprising
   (1) a polymer which is intrinsically or inherently electrically conductive, and
   (2) a polymeric dopant which
     (a) is associated with the electrically conductive polymer and
     (b) includes electrically charged groups which stabilize the electrically conductive polymer when the polymer is in an electrically conductive state, said electrically charged groups being present as part of the polymeric backbone of the dopant or as side chains pendant from the polymeric backbone of the dopant, or both.

2. A composition according to claim 1, wherein the conductive polymer is positively charged and the dopant is negatively charged.

3. A composition according to claim 2, wherein the conductive polymer is an aniline polymer.

4. A composition according to claim 2, wherein the conductive polymer is a pyrrole polymer.

5. A composition according to claim 4, wherein the polymeric dopant is an ionisable polysulphonate.

6. A composition according to claim 5, wherein the dopant is sulphonated polyethylene.

7. A composition according to claim 5, wherein the dopant is sulphonated styrene (hydrogenated) butadiene copolymer.

8. A composition according to claim 4 which is in the form of a self-supporting film.

9. A composition according to claim 8 wherein the film has a first surface and a second surface, and the concentration of the conductive polymer is greater at the first surface than at the second surface and the concentration of the polymeric dopant is greater at the second surface than at the first surface.

10. A polymer according to claim 1 wherein the electrically charged group comprises a sulphonate, carboxylate or phosphonate group.

11. A polymer according to claim 1 wherein the polymeric dopant is a polystyrene sulfonate.

12. A polymer according to claim 1 wherein the polymeric dopant is a polyacrylamidomethylpropane sulfonate.

13. A polymer composition according to claim 1 wherein the polymer is intrinsically electrically conductive.

14. A polymer composition according to claim 8 wherein the polymer is intrinsically electrically conductive.

15. A polymer composition according to claim 11 wherein the polymer is intrinsically electrically conductive.

16. A polymer composition according to claim 1 wherein the polymer is inherently electrically conductive.

17. A polymer composition according to claim 8 wherein the polymer is inherently electrically conductive.

18. A polymer composition according to claim 11 wherein the polymer is inherently electrically conductive.

19. A polymer composition comprising a pyrrole polymer which is intrinsically or inherently electrically conductive and which is associated with an ionizable polysulphonate which stabilizes the pyrrole polymer when the pyrrole polymer is in an electrically conductive state.

20. A composition according to claim 19 wherein the ionizable polysulphonate is sulphonate polyethylene.

21. A composition according to claim 19 wherein the ionizable polysulphonate is sulphonated styrene (hydrogenated) butadiene copolymer.

22. A composition according to claim 19 wherein the pyrrole polymer is intrinsically electrically conductive.

23. A composition according to claim 20 wherein the pyrrole polymer is intrinsically electrically conductive.

24. A polymer composition according to claim 19 wherein the pyrrole polymer is inherently electrically conductive.

* * * * *